US011422512B2

(12) United States Patent
Hauser

(10) Patent No.: US 11,422,512 B2
(45) Date of Patent: Aug. 23, 2022

(54) SUPPORT SYSTEM FOR A HOROLOGICAL COMPONENT

(71) Applicant: ROLEX SA, Geneva (CH)

(72) Inventor: Claude Hauser, Reignier (FR)

(73) Assignee: ROLEX SA, Geneva (CH)

( * ) Notice: Subject to any disclaimer, the term of this patent is extended or adjusted under 35 U.S.C. 154(b) by 0 days.

(21) Appl. No.: 17/105,898

(22) Filed: Nov. 27, 2020

(65) Prior Publication Data

US 2021/0165371 A1   Jun. 3, 2021

(30) Foreign Application Priority Data

Nov. 29, 2019   (EP) ..................................... 19212470

(51) Int. Cl.
| | |
|---|---|
| *G04D 3/02* | (2006.01) |
| *G04D 3/00* | (2006.01) |
| *G04D 1/06* | (2006.01) |
| *B23B 5/08* | (2006.01) |
| *B23B 31/18* | (2006.01) |
| *B25B 5/08* | (2006.01) |

(52) U.S. Cl.
CPC ........... *G04D 3/0209* (2013.01); *B23B 31/18* (2013.01); *B25B 5/087* (2013.01); *G04D 1/06* (2013.01); *G04D 3/0002* (2013.01)

(58) Field of Classification Search
CPC .. G04D 3/0209; G04D 3/0002; G04D 3/0272; G04D 3/0218; G04D 1/06; B23B 31/18; B25B 5/064; B25B 5/087
See application file for complete search history.

(56) References Cited

U.S. PATENT DOCUMENTS 5,253,880 A * 10/1993 Won ........................ B23B 31/18
279/133

FOREIGN PATENT DOCUMENTS

| DE | 202005019887 | * | 2/2006 | ....... B23B 31/16275 |
| DE | 202005019887 U1 | | 2/2006 | |
| EP | 1454691 A1 | * | 9/2004 | ............. B23B 31/18 |
| EP | 1454691 A1 | | 9/2004 | |

OTHER PUBLICATIONS

EP 1454691; Denis Jeannerat; Clamping device with elastic joints; Sep. 8, 2004; English Machine Translation; pp. 1-3 (Year: 2022).*
European Search Report and Written Opinion dated Jun. 4, 2020 in counterpart application No. EP19212470; with English machine translation (total 13 pages).

* cited by examiner

*Primary Examiner* — Bayan Salone
(74) *Attorney, Agent, or Firm* — Seckel IP, PLLC

(57) ABSTRACT

A support system (1) for a horological component (9), in particular for a horological component comprising a surface (91) generated by revolution and/or an axis (A9), includes a positioning device (2), in particular a centering device, for the horological component (9) in relation to an axis (A) of the system, and a holding device (3) for the horological component (9), the positioning device and holding device being independent and/or different and/or distinct.

22 Claims, 6 Drawing Sheets

SECTION A-A

SECTION A-A

SECTION B-B

SECTION A-A

SUPPORT SYSTEM FOR A HOROLOGICAL COMPONENT

This application claims priority of European patent application No. EP19212470.9 filed Nov. 29, 2019, the content of which is hereby incorporated by reference herein in its entirety.

The invention relates to a support system for a horological component. The invention also relates to a control system for such a support system. The invention further relates to a support installation comprising such a support system and/or such a control system. Finally, the invention relates to an operating method for a control system.

Ceramic materials, glass, natural stone, sapphire, mother-of-pearl and amorphous materials (metallic glasses) are fragile materials, the breakage of which is brought about without any prior plastic deformation in the event of stress which exceeds the limits of the material. Unlike metals which will be able to become plastically deformed, these materials are highly susceptible to breaking if the constraints are concentrated in a region, in particular a region in which there is a material defect—for example, connected with the injection. This becomes evident as a violent breakage, or the component exploding.

For turned components which are produced from ceramic material, such as watch bezels, the production method by injection involves a risk of poor concentricity in the blank and a given dispersion of the dimensions within a batch. Precision machining is therefore carried out on these blanks in order to obtain a workpiece complying with tolerances. During this step which is intended to achieve the final dimensions of the component, the constraint applied in order to retain the workpiece on the machining unit by a clamp which is controlled in terms of position can become concentrated locally, being able to cause the maximum permissible constraint to be exceed locally by the workpiece, and thus to lead to the breakage thereof during machining.

In order to turn, mill or grind rings, flanges or other workpieces with fine walls, the conventional clamping mandrels and plates have limitations, for example:
in accordance with the force applied by the movement of the elements of the clamp, the workpieces may become deformed or crack during the clamping process,
the interference contours of the clamping devices limit the accessibility of the tools and may make gripping impossible,
the modifications of the geometry of the workpiece being machined may bring about a loss of the holding thereof by the mandrel.

A number of alternatives are known for avoiding some of these problems. Different clamping devices which are very specific have been developed in accordance with the type of the workpieces to be machined, the tolerances, etc.

For example, the workpiece to be machined can be held in a mandrel which is fixedly joined to the spindle of the headstock by movable jaws, which may be internal and/or external and which also ensure the centering thereof. The positioning of the jaws is controlled in position or force. Such mandrels are specific to a workpiece geometry and must be redeveloped for each particular workpiece geometry.

There are known mandrels which have been developed to retain workpieces which are readily deformable, for example, tubes. An example of a jaw type mandrel is described in DE202005019887. The torque transmission between the jaws and the workpiece to be machined is substantially a shape adjustment. The clamping force of the jaws is controlled by a servo motor. The servo motor comprises an angle sensor and optionally a force sensor. The jaws retain the workpiece to be machined while being in contact with the lateral edges of the workpiece (axial holding). It is not possible to ensure that the workpiece retained does not undergo any plastic deformation if this workpiece has a concentricity defect. The jaws ensure both the holding and the centering of the workpiece. The force applied for the centering and the force applied for the holding are identical.

There are also known restraining mandrels with mechanical clamping. The restraining fingers are mounted in rotation and allow the restraining of the workpiece to be machined to be ensured on a support surface of the mandrel. Stops allow the positioning of the workpiece to be machined. The stops are fixed and cannot adapt to variations in the geometry of the workpiece. The centering of the workpieces is static, the force cannot be adapted in accordance with any geometric variation of the workpiece.

The object of the invention is to provide a support system for a horological component which allows the previously mentioned disadvantages to be overcome and to improve the support systems known in the prior art. In particular, the invention sets out a support system which prevents breakages of horological components and which allows tests to be carried out to check the strength of horological components.

The support system according to the invention is defined by point 1 below.

1. A support system for a horological component, in particular for a horological component comprising a surface generated by revolution and/or an axis, the support system comprising:
   a positioning device, in particular a centering device, for the horological component in relation to an axis of the system, and
   a holding device for the horological component,
   the positioning device and holding device being independent and/or distinct.

Different embodiments of the support system are defined by points 2 to 10 below.

2. The system as defined in point 1, wherein the positioning device is controlled pneumatically or hydraulically.
3. The system as defined in point 1 or 2, wherein the positioning device comprises positioning elements, in particular rollers, which can be displaced in a first direction, in particular a first radial direction in relation to the axis of the support system.
4. The system as defined in point 3, wherein the positioning device comprises a surface, in particular a frustoconical surface and/or a surface which can be displaced in accordance with the axis of the support system, the positioning elements being able to be displaced by contact with the surface, the support system optionally comprising resilient return elements for the positioning elements in contact against this surface.
5. The system as defined in points 3 or 4, wherein the system comprises at least three positioning elements and/or wherein the positioning elements are uniformly distributed about the axis of the support system.
6. The system as defined in one of the preceding points, wherein the holding device is controlled pneumatically or hydraulically.
7. The system as defined in one of the preceding points, wherein the holding device comprises holding elements, in particular rockers, which can be displaced in rotation about axes which extend in a second direction, in particular a second orthoradial direction in relation to the axis of the support system.

8. The system as defined in point 7, wherein the holding device comprises at least three holding elements and/or wherein the holding elements are uniformly distributed about the axis of the support system.
9. The system as defined in point 7 or 8, wherein the support system comprises a first member and a second member which are mounted with a sliding connection relative to each other along the axis of the support system, and wherein the holding elements are pivoted on the first member and are mounted with a mechanical connection to the second member via cam type systems, in particular desmodromic cam type systems.
10. The system as defined in the preceding point, wherein the cam type systems comprise:
    oblong grooves in the holding elements and in the second member, respectively, the grooves extending in directions which form an angle with the axis of the support system,
    pins which cooperate with the grooves and which are provided on the second member and on the holding elements, respectively.

The control system according to the invention is defined by point 11 below.

11. A control system for controlling a support system as defined in one of the preceding points, wherein it comprises:
    a first control device for a positioning device for a horological component and
    a second control device for a holding device for a horological component,
    the first and second control devices being independent and/or different and/or distinct.

Different embodiments of the control system are defined by points 12 to 13 below.

12. The system as defined in the preceding point, wherein
    the first control device comprises a first control element for the forces applied by the positioning device,
    and/or wherein
    the second control device comprises a second control element for the forces applied by the holding device.
13. The system as defined in point 12, wherein
    the first control element for the forces applied by the positioning device comprises a first force sensor, in particular a first pressure sensor, so as to control the forces applied by the positioning device,
    and/or
    the second control element for the forces applied by the holding device comprises a second force sensor so as to control the forces applied by the holding device, in particular the second control device comprising a motor and a transmission for actuating a tie rod, the second control element for the forces applied by the holding device comprising a second force sensor between the motor and the tie rod.

The support installation according to the invention is defined by point 14 below.

14. A support installation comprising a support system as defined in one of point 1 to 10 and/or a control system as defined in point 11 to point 13.

The operating method of a control system according to the invention is defined by point 15 below.

15. An operating method for a control system, in particular as defined in one of points 11 to 13, for controlling a support system as defined in one of points 1 to 10, wherein it comprises:
    a step of applying a first specification of forces applied by the positioning device, the first specification changing in accordance with the change in the dimensions of the horological component or tabulated values or linearly over time, and/or
    a step of applying a second specification of forces applied by the holding device, the second specification changing in accordance with the change in the dimensions of the horological component or tabulated values or linearly over time, and/or
    a step of applying a third specification of forces applied by the holding device, the third specification allowing a resistance test of the horological component to be carried out.

The appended drawings illustrate, by way of example, an embodiment of a support installation according to the invention.

Figure 1:
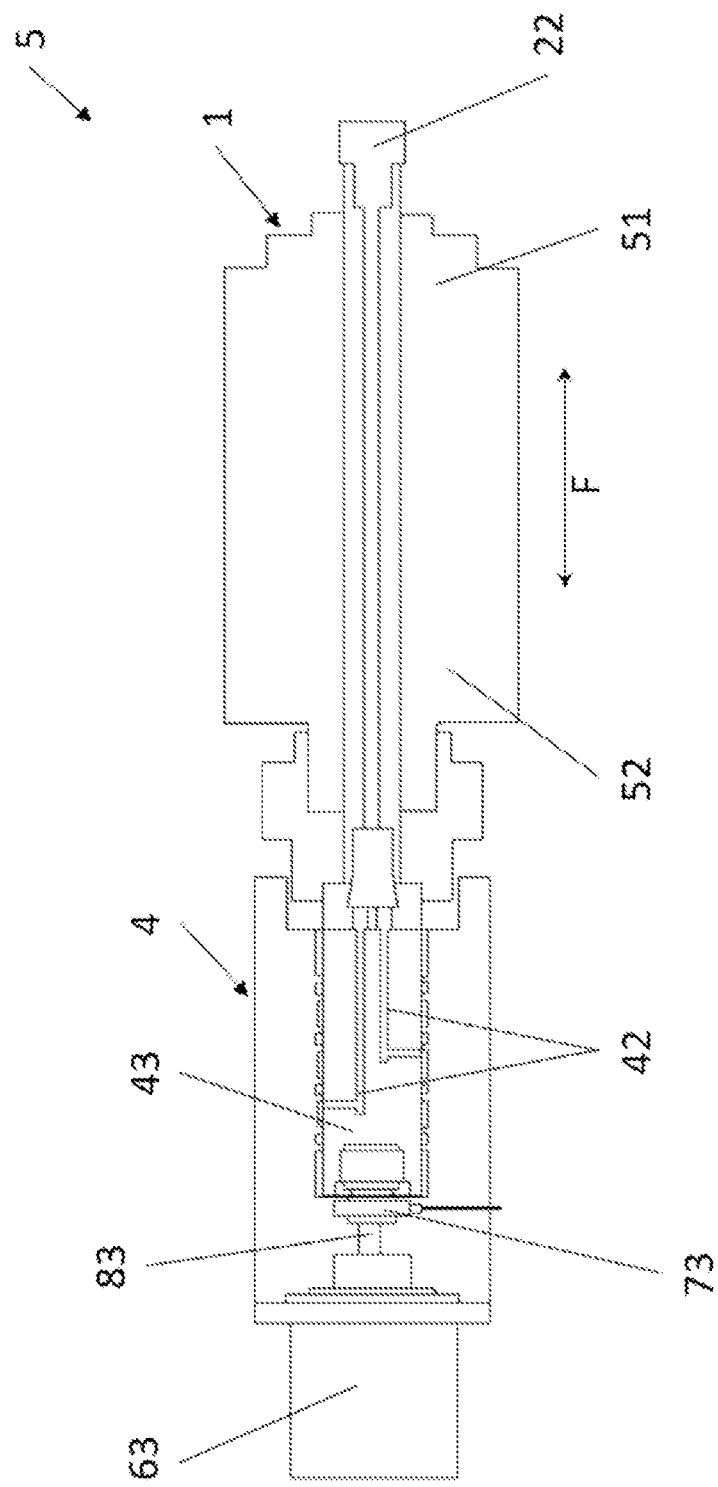
FIG. 1 is a schematic view of an embodiment of a support installation.

An embodiment of a support installation 5 is described below with reference to FIGS. 1 to 6.

The support installation 5 is intended to ensure correct positioning of a horological component 9, in particular of a horological component 9 comprising a surface 91 generated by revolution and/or an axis A9.

The horological component has, for example, an annular shape. In particular, the horological component may have a great diameter/thickness ratio (measured radially at the axis A9 and/or measured along the axis A9), for example, greater than 10 or greater than 15. The horological component may, for example, be a watch middle, a bezel, a bezel ring, a bezel decoration disk and/or display disk, a flange, a dial, a back, a casing ring or a glass member.

Such positioning is necessary to position and retain the horological component during a processing step for the horological component. The term "processing" is intended to be understood to mean any operation for modifying the horological component, in particular by removing material, such as grinding, rectification, polishing, machining (cutting tool, laser, electro-erosion), and/or by adding material, in particular surface coating or decoration.

The support installation 5 preferably comprises a support system 1 (or a set of holding clamps) and/or a control system 4 of the support system 1 (or clamping pot). The support system 1 and the control system 4 cooperate in order to ensure the holding of the horological component 9, particularly during rectification or modification phases of external dimensions.

The support system 1 for the horological component 9 comprises:
    a positioning device 2, in particular a centering device, for the horological component 9 in relation to an axis A of the system, and
    a holding device 3 for the horological component 9, the positioning device 2 and holding device 3 being independent and/or different and/or distinct.

As a result of the independence and/or distinct nature of the positioning device 2 and holding device 3, the positioning device 2 can be activated while the holding device 3 is not activated. In other words, the positioning device 2 can be in a configuration in which it acts on the horological component 9, in particular by contact, in particular by contact at the surface 91, in order to position it in relation to the support installation 5 and/or in relation to the support system, while the holding device 3 can be in a configuration in which it does not act on the horological component 9.

However, the independence and/or the distinct nature of the positioning device 2 and holding device 3 is such that the positioning device 2 can be activated while the holding device 3 is also activated.

Similarly, the independence and/or the distinct nature of the positioning device 2 and holding device 3 is such that the positioning device 2 can be deactivated while the holding device 3 is also deactivated.

Although it is not preferred, the positioning device 2 can be deactivated while the holding device 3 is activated.

The positioning device 2 serves to position the horological component 9 on the support installation 5 and/or on the support system 1. In other words, it allows it to be ensured that the horological component 9 is in a predefined position in relation to a reference system connected with the support installation 5 and/or connected with the support system 1. For example, the positioning device 2 serves to center the horological component 9 on the support system 1, that is to say, to make the axes A and A9 align. However, forces, even of moderate or weak strength, which are applied to the horological component 9 can displace it in relation to this reference system in spite of the action of the positioning device 2. In particular, no obstacle can act counter to a displacement of the horological component in relation to the support installation 5 and/or the support system 1 in one way in the direction of the axis A or A9.

The holding device 3 serves to retain or fix the horological component 9 on the support installation 5 and/or on the support system 1. In other words, it allows it to be ensured that the horological component 9 remains fixed and stationary in a predefined position in relation to the reference system connected with the support installation 5 and/or connected with the support system 1. Preferably, an obstacle is provided to act counter to a displacement of the horological component 9 in relation to the support installation 5 and/or the support system 1 in one way in the direction of the axis A or A9.

Forces which have a considerable intensity and which are applied (for example, during a machining operation) to the horological component 9 could displace it in relation to this reference system in spite of the action of the positioning device. In particular, the holding device 3 provides for obstacles, which act counter to a displacement of the horological component 9 in relation to the support installation 5 and/or the support system 1, in the direction of the axis A or A9.

Therefore, the support system 1 ensures both the positioning, in particular the centering of the horological component 9, and the holding of the horological component 9 in this position.

The support system 1 preferably has a generally cylindrical shape centered about the axis A. The support system 1 comprises a frame comprising a first cap 51 and a second cap 52. The first cap 51 and second cap 52 are preferably mounted so as to be fixedly joined to each other. The first and second caps form a casing.

The positioning device 2 is, for example, controlled pneumatically or hydraulically, that is to say that the control system 4 comprises a pneumatic or hydraulic control device, which acts on an element of the positioning device 2.

The positioning device 2 comprises positioning elements 21, in particular rollers 21, which can be displaced in a first direction 28, in particular a first radial direction 28 in relation to the axis A of the support system 1. Each of the positioning elements can be movable or displaced in a specific direction 28. The specific directions 28 can be different for each of the positioning elements. Advantageously, each of the specific direction 28 is a radial direction regarding the axis A. Advantageously, the specific directions 28 are disposed with a constant angular offset around axis A (angular offset $\alpha$ between two adjacent specific directions: $\alpha=360°/n$, with n the number of positioning elements 21).

The positioning elements 21, in particular the rollers 21 may or may not be deformable, for example, while comprising a portion of elastomer material. Alternatively or additionally, the positioning elements 21, in particular the rollers 21, may be able to be spaced apart. The positioning elements 21, in particular the rollers 21, are preferably produced from metal. The positioning elements 21, in particular the rollers 21, are arranged or disposed so as to apply radial forces to the horological component 9 to be positioned and to be retained. The positioning elements 21, in particular the rollers 21, may have a shape which allows the distribution of the forces over a contact surface 91 of the horological component 9 to be processed. For example, the positioning elements 21, in particular the rollers 21, are conical or frustoconical or conform to the shape of the horological component 9 to be processed.

In the case of a positioning device 2 with rollers which can be spaced apart or with rollers which can be deformed laterally, the positioning device 2 comprises a centering head 22 which includes a surface 23, in particular a frustoconical surface 23 and/or a surface which can be displaced in accordance with the axis A of the support system 1, the positioning elements 21 being able to be displaced by contact with the surface 23.

The centering head 22, and consequently the frustoconical surface 23, are displaced in translation along the axis A by the action of an actuator which mainly comprises a cylinder 25 and a piston 24. The piston 24 is fixedly joined to the centering head 22. The actuator is supplied with fluid via pipes 26, 27 and 29. The cylinder 25 is in turn fixedly joined to the frame of the support system 1. When the actuator is actuated, the centering head 22 is therefore displaced in translation along the axis A in relation to the frame.

Advantageously, the support system optionally comprises resilient return elements for the positioning elements 21 in contact against this surface 23.

Preferably, the support system comprises at least three positioning elements 21, in particular three, four, five or six.

Alternatively or additionally, the positioning elements 21 are uniformly distributed about the axis A of the support system 1.

The positioning elements 21 can be fixed in place by means of the cap 51 comprising openings which are suitable for ensuring the holding of the positioning elements 21 between a stop 231, the centering head 22 and the cap 51. When the centering head 22 activates the positioning elements 21, they are compressed against the horological component 9 to be processed by tilting and/or sliding and/or becoming deformed in order to ensure the positioning function.

For a specific variant (not illustrated) with deformable rollers, for example, made of elastomer material, the centering head may comprise an upper portion which moves into abutment against the upper portion of the rollers. The centering head may be cylindrical.

In order to carry out the positioning of the horological component 9, radial forces are applied by the positioning elements 21 to the horological component 9. These radial forces are preferably pneumatically or hydraulically controlled.

Figure 2:
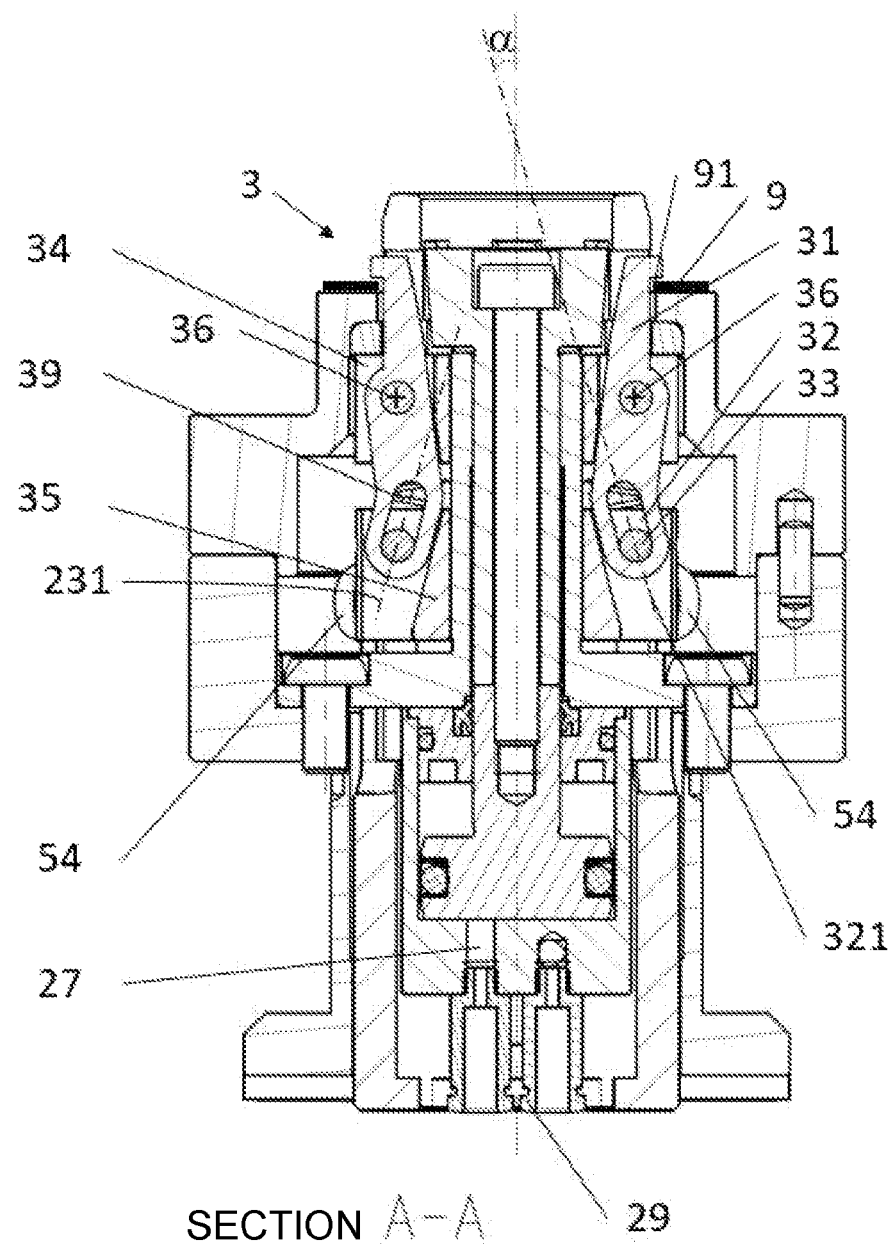
FIG. 2 is a cross-section, along a plane A-A which is depicted in FIG. 6, of an embodiment of a support system in a holding configuration for a horological component.
Figure 3:
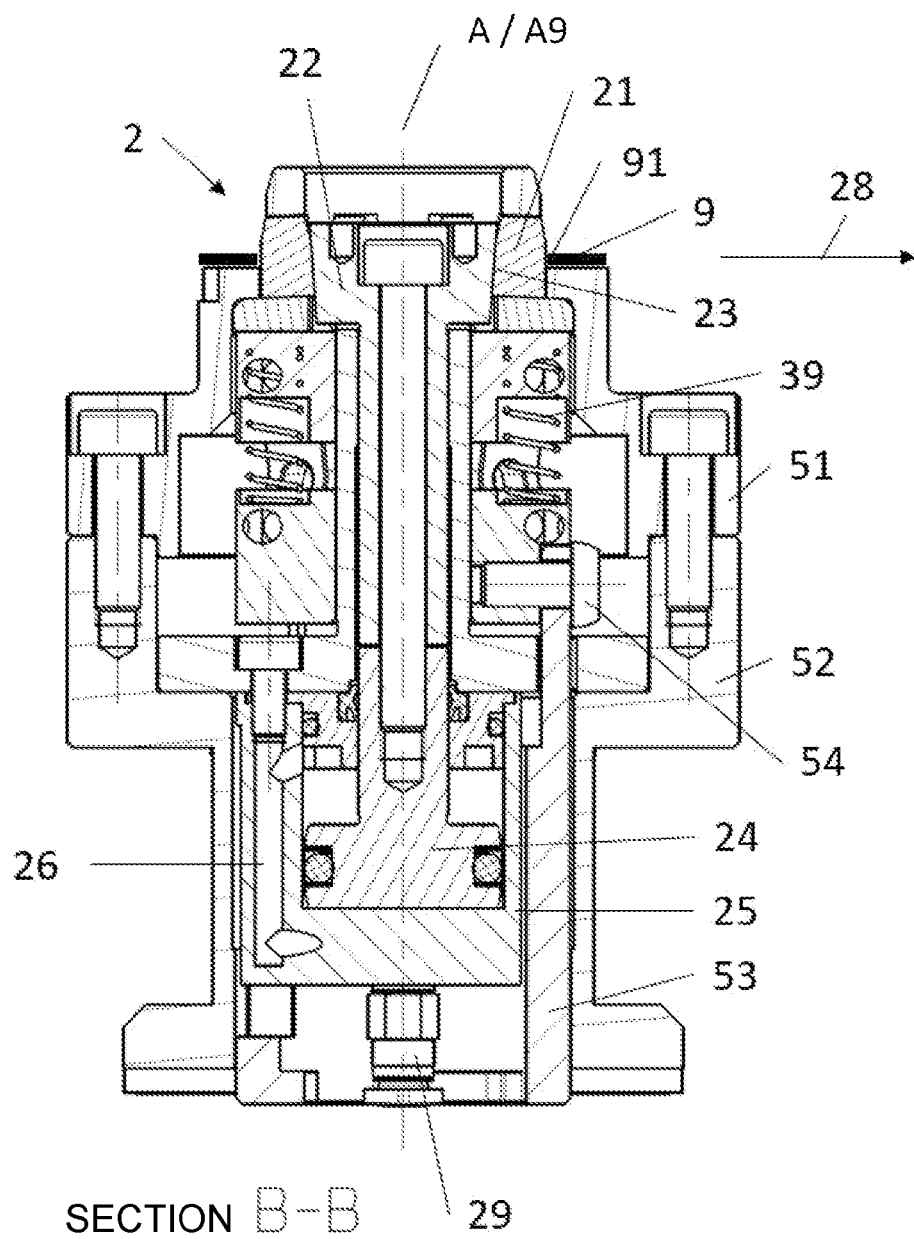
FIG. 3 is a cross-section, along a plane B-B which is depicted in FIG. 6, of the embodiment of the support system in the holding configuration for a horological component.

In an activated configuration of the actuator, which is illustrated in FIGS. 2 and 3, a fluid is introduced into the actuator so as to displace the piston 24 and to return the centering head 22 into the first cap 51. This results in activation of the positioning device 2, that is to say, the radial displacement outwardly in relation to the axis A and/or the deformation of the positioning elements 21 so that they act on the horological component 9. The positioning elements 21 thus move into contact with the internal surface 91 of the horological component 9 to be positioned with a force controlled by the actuator. This configuration allows the component to be positioned. This configuration particularly allows the horological component 9 to be centered.

Figure 4:
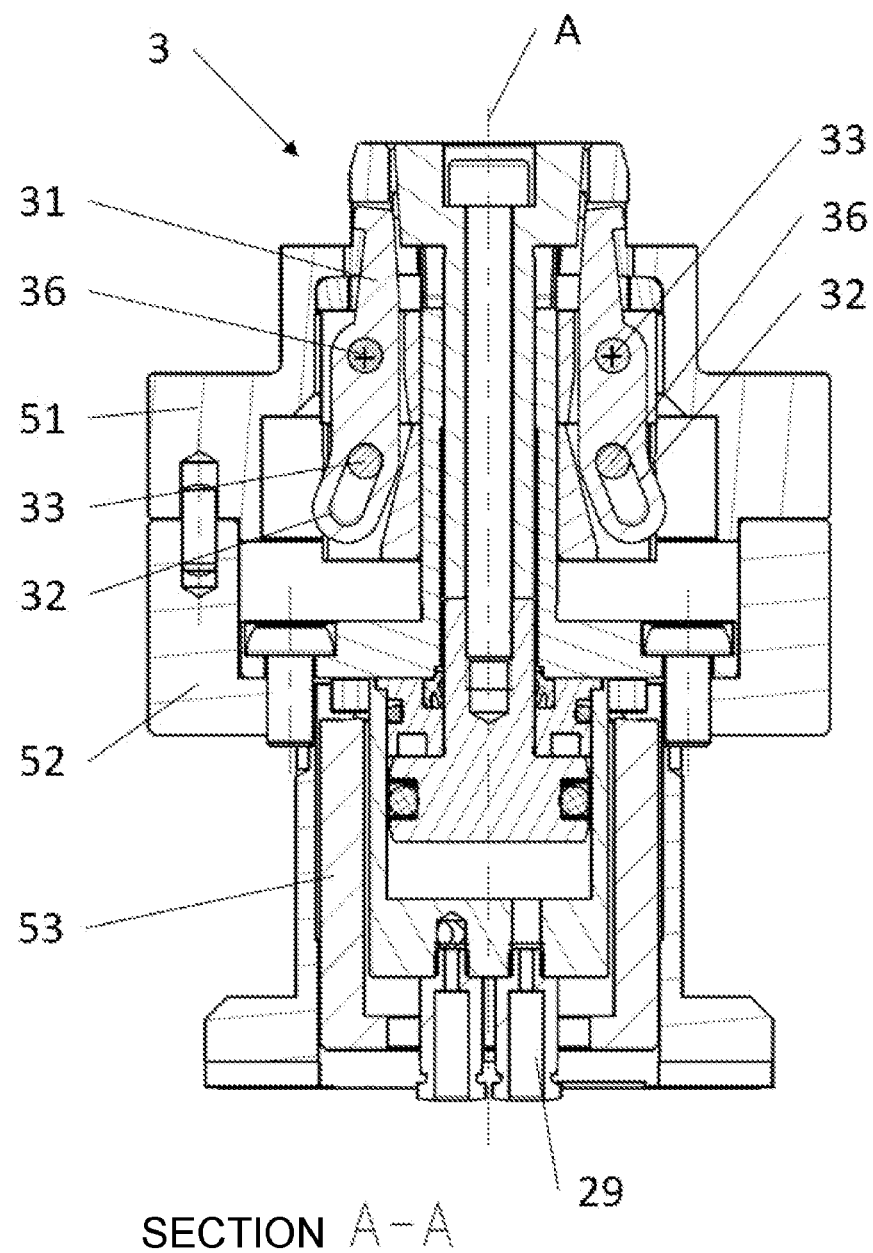
FIG. 4 is a cross-section, along the plane A-A, of the embodiment of the support system in a release configuration for a horological component.
Figure 5:
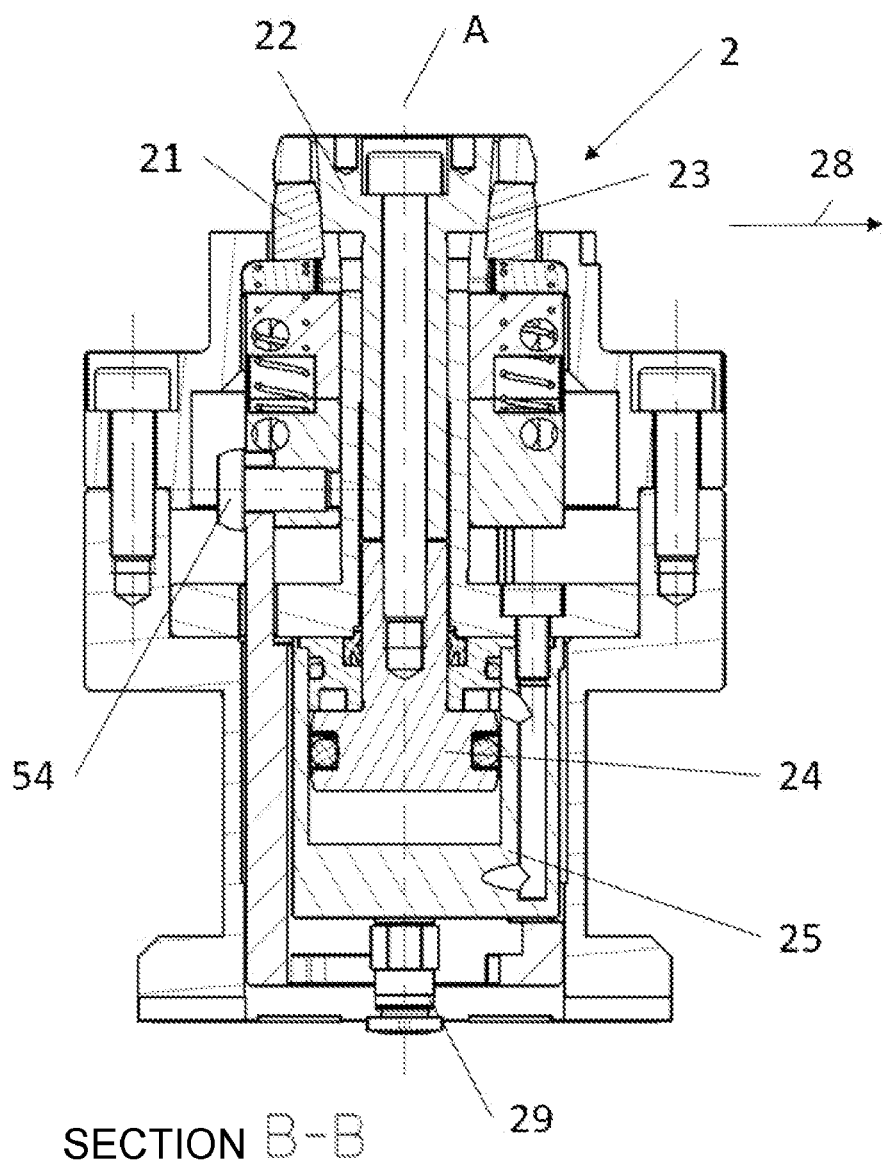
FIG. 5 is a cross-section, along the plane B-B, of the embodiment of the support system in a release configuration for a horological component.

In a deactivated configuration of the actuator illustrated in FIGS. 4 and 5, a fluid is introduced into the actuator in order to displace the piston 24 and to withdraw the centering head 22 from the first cap 51. This results in deactivation of the positioning device 2, that is to say, release of the positioning elements 21.

By modifying the fluid pressure at one side and the other of the piston 24, the centering head 22 is displaced and acts on the positioning elements 21 by moving them apart or compressing them to a greater or lesser extent. Radial forces are thus applied to the horological component 9 to be processed in a manner proportional to the pressure in the actuator.

The holding device 3 is, for example, pneumatically or hydraulically controlled, that is to say that the holding system comprises a pneumatic or hydraulic control device which acts on an element of the holding device 3.

The holding device 3 preferably comprises holding elements 31, in particular rockers 31, which can be displaced in rotation about axes 36 which extend in a second direction, in particular a second orthoradial direction in relation to the axis A of the support system 1. The holding elements 31 are, for example, mounted with a pivot connection about the axis 36 on the first member 34.

The holding device 3 comprises, for example, at least three holding elements 31, in particular three, four, five or six.

Alternatively or additionally, the holding elements 31 are uniformly distributed about the axis A of the support system 1.

Preferably, a second member 35 is mounted with a sliding connection along the axis A in relation to the first member 34 and the holding elements 31 are pivoted on the first member 34 and are mounted with a mechanical connection to the second member 35 via cam type systems 32, 33, in particular desmodromic cam type systems.

Helical springs 39 are received in a compressed manner between the first member 34 and the second member 35. Thus, the first and second members are connected to each other by springs 39 and by the holding elements 31.

A tie rod 53 is movable in translation along the axis A in the frame. The tie rod 53 is fixed to the second member 35, for example, by a screw 54. Thus, the tie rod 53 allows the displacement of the second member 35 in relation to the first member 34 by pushing it, toward the first member 34, counter to the action of the springs 39. The tie rod also allows displacement of the second member 35 in relation to the first member 34 by pulling it in order to move it away from the first member 34 and to activate the holding elements 31.

The cam type systems comprise, for example:
oblong grooves 32 in the holding elements 31 and in the second member 35, respectively, the grooves extending in directions 321 which form an angle $\alpha$ with the axis A of the support system 1,
pins 33 which cooperate with the grooves and which are provided on the second member 35 and on the holding elements 31, respectively.

The angle $\alpha$ has, for example, a value between 10° and 30°, in particular in the configuration of FIGS. 2 and 3.

Thus, the support system 1 also comprises holding means 31 which allow the flange-mounting of the horological component 9 which is intended to be processed to be ensured, for example, in the form of flange fingers which are located at the end of rockers or flange fingers which are movable in rotation.

In conclusion, the support system 1 positions and retains the horological component 9 to be processed, in a centered manner, and ensures the axial and radial holding thereof throughout the processing operation with a suitable force in order to prevent over-stressing the horological component 9 to be processed. The introduction and withdrawal of the horological component 9 are facilitated, as are the different adjustment operations of the support system 1. The robustness of the known support systems is improved.

The horological component 9 can be positioned or centered by rollers 21 and retained on the support system 1 by means of fingers or flanges 31. The forces applied are selected in order to ensure that the horological component 9 is not deformed by the centering device 2 while ensuring that the device completely retains the horological component 9 during a processing operation, in particular a machining operation.

The support system 1 is, for example, assembled on the control system by a bayonet type system.

In an activated configuration of the holding device 3 in FIGS. 2 and 3, the tie rod 53 releases the second member 35 so as to move the second member 35 away from the first member 34 under the effect of the springs 39. The action of the pins 33 in the grooves 32 brings about the rotation of the holding elements 31 about the axes 36 and the pressing of the holding elements 31 on the horological component 9. The holding device 3 is thus activated. In this position, the horological component 9 to be processed is retained on the support system 1. The holding elements 31 apply radial forces to the surface 91 of the horological component 9 and/or axial forces (in relation to the axis A) to the upper surface of the horological component 9 opposite the surface of the horological component 9 in contact against the cap 51.

The force applied to the tie rod 53 is adapted in accordance with the force of the springs, the reference system of the horological component 9 to be processed and tabulated values or on the basis of dimensional measurements carried out directly on a machine comprising the support system 1 and allowing the processing operation. The force is advantageously controlled in compression and traction. It allows gentler linear movements of the tie rod, that is to say, with fewer jerky actions.

In a deactivated configuration of the holding device 3 in FIGS. 4 and 5, the tie rod is activated in order to compress the springs 39 between the first member 34 and the second member 35. The action of the pins 33 in the grooves 32 brings about the rotation of the holding elements 31 about axes 36 so as to release the horological component 9. The holding device 3 is thus deactivated. In this configuration, the horological component 9 can be placed on the support system 1 or removed from the support system 1.

Figure 6:
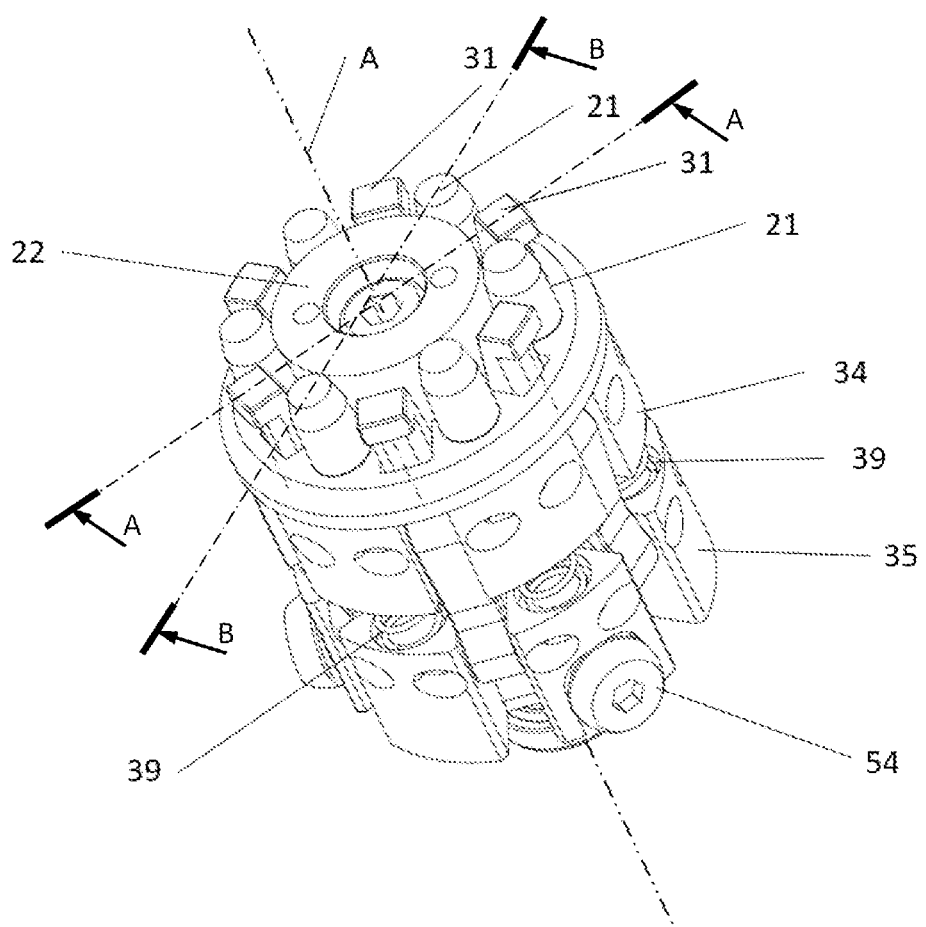
FIG. 6 is a partial, perspective view of the embodiment of the support system in a release configuration for a horological component.

In the example illustrated in FIG. 6, six positioning elements 21 and six holding elements 31 are arranged to ensure a good distribution of the positioning and holding forces.

Advantageously, the number of holding elements 21 is identical to the number of positioning elements 31.

Advantageously, the positioning elements 21 are interposed between the holding elements 31.

The control system 4 allows the support system 1 to be controlled. The control system 4 comprises:
 a first control device 42 for the positioning device 2 for the horological component 9 and
 a second control device 43 for the holding device 3 for the horological component 9.

The first and second control devices being independent and/or distinct.

As a result of the independence and/or distinct nature of the control devices, the positioning device 2 and the holding device 3 can be activated independently, as explained above.

The first control device 42 comprises a pressurized fluid supply which is connected to the pipes 26, 27 and 29. The supply comprises control elements for the pressure of the fluid and the commutation means of the fluid supply in order to allow the actuator to be activated in both operating directions thereof.

The second control device 43 comprises an electromechanical actuator which includes a motor 63 and a transmission 83, in particular a ballscrew unit 83. The transmission 83 allows the motor 63 to be connected to the tie rod 53. Thus, the motor 63 allows actuation of the tie rod 53 via the transmission 83.

The ballscrew unit 83 which is advantageously positioned between the motor 63 and the sensor 73 allows optimization of the conversion of a rotational movement of the motor 63 into a translational movement of the tie rod 53. The accelerations and decelerations of the motor 63 are thus transmitted in a manner which is better controlled, the holding forces being transmitted with fewer jerky actions. This ensures both the reversibility of the controls and better control of the forces transmitted by the control system. The configuration of the control system allows great control of the linear movements of the tie rod 53. It is possible to control the position, travel, speed and accelerations and decelerations thereof.

The first control device 42 comprises a first control element for the forces applied by the positioning device 2. The first control element for the forces applied by the positioning device 2 may comprise a first force sensor, in particular a fluid pressure sensor, so as to control the forces applied by the positioning device 2.

The second control device 43 comprises a second control element for the forces applied by the holding device 3.

Advantageously, the second control element for the forces applied by the holding device 3 comprises a second force sensor 73 between the motor 63 and the tie rod 53. This second force sensor 73 can allow control of the forces applied by the holding device 3.

The second force sensor 73 (for example, in the range from 0 to 500 N) is placed between the motor 63 and the tie rod 53 in order to measure a force F which is applied to the tie rod 53 so as to keep the constraint which is applied to the horological component 9 within tolerable limits. A particular geometry of the support system 1 allows distribution of the force over the different support locations in accordance with the geometry of the horological component, so as to prevent the maximum constraint permissible locally from thereby being exceeded. The force F can be controlled in both compression and traction.

The force sensor 73 allows measurement of the forces in the order of from 0 to 500 N and operates in compression and traction. The force sensor 73 may be a piezoelectric sensor. In a variant, the sensor 73 is replaced by a force limiter, for example a spring which allows the force of the tie rod 53 to be limited to a predetermined value, for example, to 250 N.

The translational movement of the tie rod 53 allows precise control of the holding force of the holding elements of the horological component 9.

The holding force is therefore controlled in accordance with the force applied to the tie rod 53. Alternatively, a measurement of the position of the tie rod 53 can also be associated with the measurement in force in order to make the control of the holding force more reliable.

The control system may have a substantially cylindrical form. For example, it allows control of the rotational and translational movements of a support system 1 in a machining lathe.

The control system advantageously further comprises a rotary joint which allows the actuator which actuates the positioning function on the support system 1 to be supplied with fluid.

An embodiment of an operating method of the control system 4 for controlling the support system 1 is described below.

The method comprises:
 a step of applying a first specification of forces applied by the positioning device 2, the first specification changing, for example, in accordance with the change in the dimensions of the machined component or tabulated values or linearly over time, and/or
 a step of applying a second specification of forces applied by the holding device 3, the second specification changing, for example, in accordance with the change in the dimensions of the machined component or tabulated values or linearly over time, and/or
 a step of applying a third specification of forces applied by the holding device 3, the third specification allowing a resistance test of the horological component 9 to be carried out. This is because the support installation 5 can also be used to carry out a test. The positioning device 2 may allow a test by applying radial forces. The holding device 3 may allow a test by applying compression forces. If the horological component withstands the test, it is compliant. Otherwise, the horological component 9 is destroyed, given the fragile nature of the preferred material of the horological component 9.

The positioning forces and/or holding forces applied can be adapted during the machining in order to take account of the variations in geometry of the horological component 9 during the machining operation and remain below the limit of the material of the horological component 9. Thus, the forces may change, for example, in accordance with the change of the dimensions of the machined component or tabulated values.

Preferably, during positioning of a horological component on the support installation, the intensity of the force of the positioning device applied to the horological component increases linearly over time until reaching a first force specification target. Preferably, during the positioning of the horological component on the support installation, the intensity of the force of the holding device applied to the horological component increases linearly over time until reaching a second force specification target. Thus, for example, the forces may change linearly over time.

In other words, the solutions according to the invention may involve a gripping system for machining a horological component 9 with a geometry generated by revolution, comprising a set of clamps provided with a centering device for the horological component controlled in force by a pneumatic actuator which is associated with a holding device 3 of the horological component 9 controlled in force by a clamping pot. The centering and holding of the horological components can be carried out from the interior of a horological component. Alternatively, the horological component can be centered and retained from the exterior. In a variant, the centering can be carried out from the interior and the holding can be carried out from the exterior, or vice versa.

In the solutions set out above, therefore, there is provided a gripping means for the horological components which is controlled in force and not in position, allowing gripping of horological components whose initial circularity and/or concentricity is not complete, preventing them from breaking during machining.

Advantageously, the control in force of the set of gripping clamps also allows a test to be carried out in situ, by shattering even before the start of machining the horological components which would contain an excessively great quantity of defects at the end of the preceding manufacturing steps.

As a result of the solutions described above, the holding force is better controlled, whatever the dimensions of the horological component to be processed and it is thus possible to reduce the reject rate (breakage and/or circularity defect). The centering means of the set of clamps themselves allow a reduction in the number of horological components having concentricity and/or circularity defects after the processing step.

The holding is carried out by controlling the elements of the set of clamps in force and not by positional control. This allows an improvement of the gripping of the bezel disks during rectification steps. The solutions described are particularly suitable for retaining fragile workpieces with geometry generated by revolution, such as horological components of ceramic material, during rectification steps.

By the specific control in force of the control elements of the set of clamps (clamping pot and actuator), the holding and positioning forces can be adapted in accordance with the change of the dimensions of the horological component by calculating the constraints as a function of the thicknesses or by using values which are tabulated with precalculated data or by measurements in situ of the horological component in order never to over-stress the horological component. The geometry of the horological component being caused to be modified during the machining operations, the forces applied can vary so as to keep stresses constant during the progress of the machining operation.

The invention claimed is:

1. A support system for a horological component, the support system comprising:
   a positioning device for the horological component in relation to an axis of the system, and
   a holding device for the horological component,
   the positioning device and holding device being independent, distinct, or both independent and distinct,
   wherein the positioning device comprises positioning elements which can be displaced in a first direction.

2. The support system as claimed in claim 1, wherein the positioning device is controlled pneumatically or hydraulically.

3. The support system as claimed claim 1, wherein the positioning device comprises a surface, the positioning elements being able to be displaced by contact with the surface.

4. The support system as claimed in claim 1, wherein at least one selected from the group consisting of:
   the support system comprises at least three positioning elements,
   the positioning elements are uniformly distributed about the axis of the support system.

5. The support system as claimed in claim 1, wherein the holding device is controlled pneumatically or hydraulically.

6. The support system as claimed in claim 1, wherein the holding device comprises holding elements which can be displaced in rotation about axes which extend in a second direction.

7. The support system as claimed in claim 6, wherein at least one selected from the group consisting of:
   the holding device comprises at least three holding elements,
   the holding elements are uniformly distributed about the axis of the support system.

8. The support system as claimed in claim 6, wherein the support system comprises a first member and a second member which are mounted with a sliding connection relative to each other along the axis of the support system, and wherein the holding elements are pivoted on the first member and are mounted with a mechanical connection to the second member via cam systems.

9. The support system as claimed in claim 8, wherein the cam systems comprise:
   oblong grooves in the holding elements and in the second member, respectively, the grooves extending in directions which form an angle with the axis of the support system, and
   pins which cooperate with the grooves and which are provided on the second member and on the holding elements, respectively.

10. A control system for controlling a support system for a horological component, the support system comprising:
    a positioning device for the horological component in relation to an axis of the system, and
    a holding device for the horological component,
    the positioning device and holding device being independent, distinct, or both independent and distinct,
    wherein the control system comprises:
    a first control device for the positioning device for the horological component, and
    a second control device for the holding device for the horological component,
    the first and second control devices being independent, different, distinct, independent and different, independent and distinct, different, and distinct, or independent, different and distinct.

11. The control system as claimed in claim 10, wherein at least one selected from the group consisting of:
the first control device comprises a first control element for the forces applied by the positioning device,
the second control device comprises a second control element for the forces applied by the holding device.

12. The control system as claimed in claim 11, wherein at least one selected from the group consisting of:
the first control element for the forces applied by the positioning device comprises a first force sensor, so as to control the forces applied by the positioning device,
the second control element for the forces applied by the holding device comprises a second force sensor so as to control the forces applied by the holding device.

13. A support installation comprising the support system as claimed in claim 1.

14. A method of operating the control system as claimed in claim 10,
wherein the method comprises at least one selected from the group consisting of:
applying a first specification of forces applied by the positioning device, the first specification changing in accordance with the change in the dimensions of the horological component or tabulated values or linearly over time,
applying a second specification of forces applied by the holding device, the second specification changing in accordance with the change in the dimensions of the horological component or tabulated values or linearly over time,
applying a third specification of forces applied by the holding device, the third specification allowing a resistance test of the horological component to be carried out.

15. The control system as claimed in claim 11, wherein at least one selected from the group consisting of:
the first control element for the forces applied by the positioning device comprises a first force sensor which is a first pressure sensor, so as to control the forces applied by the positioning device,
the second control element for the forces applied by the holding device comprises a second force sensor so as to control the forces applied by the holding device, the second control device comprising a motor and a transmission for actuating a tie rod, the second control element for the forces applied by the holding device comprising a second force sensor between the motor and the tie rod.

16. The support system as claimed in claim 1, wherein the horological component comprises at least one selected from the group consisting of:
a surface generated by revolution,
an axis.

17. The support system as claimed in claim 1, wherein the positioning elements are rollers and the first direction is a first radial direction in relation to the axis of the support system.

18. The support system as claimed in claim 3, wherein the surface is at least one surface selected from the group consisting of:
a frustoconical surface,
a surface which can be displaced in accordance with the axis of the support system,
the support system comprising return elements for the positioning elements in contact against the surface.

19. The support system as claimed in claim 6, wherein the holding elements are rockers and the second direction is a second orthoradial direction in relation to the axis of the support system.

20. A support system for a horological component, the support system comprising:
a positioning device for the horological component in relation to an axis of the system, and
a holding device for the horological component,
the positioning device and holding device being independent, distinct, or both independent and distinct,
wherein the positioning device is controlled pneumatically or hydraulically.

21. A support system for a horological component, the support system comprising:
a positioning device for the horological component in relation to an axis of the system, and
a holding device for the horological component,
the positioning device and holding device being independent, distinct, or both independent and distinct,
wherein the holding device is controlled pneumatically or hydraulically.

22. A support system for a horological component, the support system comprising:
a positioning device for the horological component in relation to an axis of the system, and
a holding device for the horological component,
the positioning device and holding device being independent, distinct, or both independent and distinct,
wherein the holding device comprises holding elements which can be displaced in rotation about axes which extend in a second direction,
wherein the support system comprises a first member and a second member which are mounted with a sliding connection relative to each other along the axis of the support system, and
wherein the holding elements are pivoted on the first member and are mounted with a mechanical connection to the second member via cam systems,
wherein the cam systems comprise:
oblong grooves in the holding elements and in the second member, respectively, the grooves extending in directions which form an angle with the axis of the support system, and
pins which cooperate with the grooves and which are provided on the second member and on the holding elements, respectively.

* * * * *